(12) United States Patent
Goodman

(10) Patent No.: US 10,700,611 B2
(45) Date of Patent: Jun. 30, 2020

(54) CURRENT-TO-VOLTAGE POWER CONVERTER

(71) Applicant: Halliburton Energy Services, Inc., Houston, TX (US)

(72) Inventor: George David Goodman, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/740,473

(22) PCT Filed: Dec. 28, 2016

(86) PCT No.: PCT/US2016/069008
§ 371 (c)(1),
(2) Date: Dec. 28, 2017

(87) PCT Pub. No.: WO2018/125104
PCT Pub. Date: Jul. 5, 2018

(65) Prior Publication Data
US 2019/0312518 A1  Oct. 10, 2019

(51) Int. Cl.
*G05F 1/56* (2006.01)
*H02M 3/335* (2006.01)
(Continued)

(52) U.S. Cl.
CPC ..... *H02M 3/33569* (2013.01); *E21B 41/0085* (2013.01); *G05F 1/56* (2013.01);
(Continued)

(58) Field of Classification Search
CPC .. H02M 3/33569; H02M 3/3374; H02M 1/08; H02M 3/33561; G05F 1/56; E21B 41/0085
See application file for complete search history.

(56) References Cited

U.S. PATENT DOCUMENTS 4,677,367 A   6/1987  Goodman
4,698,740 A  10/1987  Rodgers et al.
(Continued)

FOREIGN PATENT DOCUMENTS

GB       2448928 A    5/2008
KR   20100025977 A    3/2010

OTHER PUBLICATIONS

Digtitimer, "Constant Stimulation & Compliance Voltage," Oct. 13, 2016, pp. 1-6 (Year: 2016).*
(Continued)

*Primary Examiner* — Pinping Sun
(74) *Attorney, Agent, or Firm* — John W. Wustenberg; Parker Justiss, P.C.

(57) ABSTRACT

A current fed power supply circuit, a method for producing DC voltages from a current source, and a power delivery system are provided herein. One embodiment of a current fed power supply circuit includes: (1) input terminals, (2) an energy storage device having a first end coupled to the input terminals, (3) power switching circuitry coupled to a second end of the energy storage device and including a transformer having a primary winding and a plurality of secondary windings, and (4) multiple output terminals that are each uniquely coupled to one of the plurality of secondary windings, wherein the power switching circuitry converts a current received at the input terminals to a plurality of regulated voltages at the multiple output terminals.

19 Claims, 9 Drawing Sheets

(51) Int. Cl.
  *E21B 41/00* (2006.01)
  *H02M 1/08* (2006.01)
  *H02M 3/337* (2006.01)

(52) U.S. Cl.
  CPC .......... *H02M 1/08* (2013.01); *H02M 3/3374* (2013.01); *H02M 3/33561* (2013.01)

(56) References Cited

U.S. PATENT DOCUMENTS

| | | | | |
|---|---|---|---|---|
| 4,779,185 A * | 10/1988 | Musil | ................. | H02M 3/28 323/222 |
| 5,128,852 A * | 7/1992 | Rettenmaier | ..... | H02M 3/33561 363/133 |
| 5,550,411 A * | 8/1996 | Baker | ................. | G05F 1/613 307/100 |
| 5,619,404 A * | 4/1997 | Zak | ................. | H02M 1/4258 363/16 |
| 5,744,887 A | 4/1998 | Itoh | | |
| 5,999,417 A * | 12/1999 | Schlecht | ........... | H02M 3/33592 363/16 |
| 6,094,366 A * | 7/2000 | Kalfhaus | ............. | H02M 1/4258 363/73 |
| 6,195,273 B1 * | 2/2001 | Shteynberg | ............. | H02M 1/44 363/26 |
| 6,501,194 B1 * | 12/2002 | Jiang | ................. | H02J 9/062 307/104 |
| 6,642,631 B1 * | 11/2003 | Clavette | ................. | H02J 1/102 307/52 |
| 6,927,544 B2 * | 8/2005 | Nostwick | ............... | H05B 41/28 315/246 |
| 7,221,128 B2 * | 5/2007 | Usui | ................. | H02M 1/36 323/207 |
| 7,598,717 B2 * | 10/2009 | O'Meara | ................ | H02M 3/156 323/283 |
| 8,624,530 B2 | 1/2014 | Chung et al. | | |
| 8,988,030 B2 | 3/2015 | Hernandez Marti et al. | | |
| 9,059,587 B2 | 6/2015 | Williams | | |
| 2002/0181259 A1 * | 12/2002 | Duerbaum | ........ | H02M 3/33561 363/89 |
| 2005/0225176 A1 * | 10/2005 | Gan | ................. | H02M 3/33561 307/31 |
| 2010/0039080 A1 * | 2/2010 | Schoenbauer | ...... | H02M 3/1582 323/234 |
| 2010/0165670 A1 * | 7/2010 | Piazzesi | ............ | H02M 3/33523 363/21.12 |
| 2010/0244726 A1 | 9/2010 | Melanson | | |
| 2013/0027984 A1 * | 1/2013 | Takegami | ............... | H02M 1/34 363/21.01 |
| 2014/0160806 A1 * | 6/2014 | Han | ................. | H02M 3/33561 363/21.02 |
| 2015/0288192 A1 * | 10/2015 | Wang | ................... | H02M 3/158 307/52 |
| 2016/0072392 A1 | 3/2016 | Soares et al. | | |
| 2016/0348478 A1 * | 12/2016 | Goodman | ........... | E21B 41/0085 |
| 2017/0280523 A1 * | 9/2017 | Kathiresan | ......... | H05B 33/0815 |
| 2017/0373496 A1 * | 12/2017 | Hu | ........................... | H02J 1/00 |
| 2018/0183339 A1 * | 6/2018 | Radic | ................ | H02M 3/33507 |

OTHER PUBLICATIONS

De Oliveira, et al.; "A Methodology for the Development of a Subsea Electrical Power Transmission and Distribution System"; OTC 24129; Offshore Technology Conference; May 6-9, 2013; pp. 1-12.

* cited by examiner

CURRENT-TO-VOLTAGE POWER CONVERTER

CROSS-REFERENCE TO RELATED APPLICATION

This application is the National Stage of, and therefore claims the benefit of, International Application No. PCT/US2016/069008 filed on Dec. 28, 2016, entitled "CURRENT-TO-VOLTAGEPOWER CONVERTER." The above application is commonly assigned with this National Stage application and is incorporated herein by reference in its entirety.

BACKGROUND

Power converters are used extensively in consumer products and in industrial equipment. Various types of power converters are used in the different applications. One common type of power converter that is used in many applications is a voltage-to-voltage power converter. A voltage-to-voltage power converter, whether for alternating current (AC) or direct current (DC), receives a voltage input at a first value and provides a voltage output at a second value. Conventional voltage-to-voltage power converters are typically designed to operate from low source resistance voltage sources for compatibility with most systems that strive to minimize source resistance to optimize efficient power delivery.

BRIEF DESCRIPTION

Reference is now made to the following descriptions taken in conjunction with the accompanying drawings, in which.

DETAILED DESCRIPTION

Figure 1:
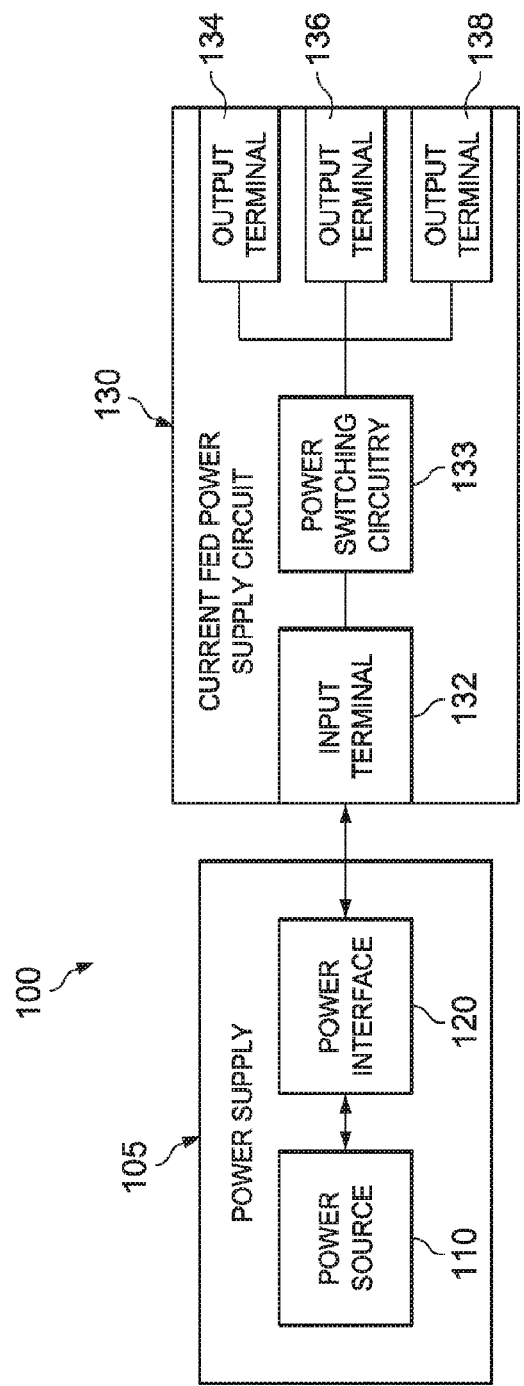
FIG. 1 illustrates a system diagram of a power delivery system.

Though conventional power converters are often designed to operate in systems having a low input impedance, there are some applications where a power converter is needed where there is a high input impedance. For example, the wireline logging industry requires operation of power converters from high source resistance wireline cables. The high source resistance wireline cables, however, have power delivery limitations that can result in lost job-time-failures. The power delivery limitations include wide downhole cable-head operating voltage ranges and power system instability.

Accordingly, the disclosure provides a current fed power supply circuit that accepts a current at its input, and produces a plurality of regulated voltages at its output. The current fed power supply circuit can be a current-to-voltage power converter. Current-to-voltage converter schemes yield optimum performance when operating from a high source impedance (such as a long wireline cable), and become problematic when fed from a low impedance source, such as a conventional "off-line" voltage power converter.

In some applications, where a high input impedance is present, multiple voltage outputs are needed. Considering again the above example of the wireline logging industry, multiple voltage outputs are often needed downhole to power various tools. Accordingly, the disclosed current fed power supply circuit supports multiple outputs.

Though the wireline logging industry is one application in which the disclosed current fed power supply circuit can be employed, the disclosed topology is not limited to these applications. For example, the current fed power supply circuit can also be employed in solar array power systems, wireless chargers for automobiles and portable equipment, and electric cars. In such applications, the inductive coupling means provides near lossless ballast for feeding a current to a current-to-voltage converter. Thus, the disclosed current fed power supply circuit can be used in lossy applications such as downhole tools and in lossless applications such as the reactive coupling examples provided above. The current fed power supply circuit can also be used in a downhole applications that uses reactive coupling, such as, induction power transfer across pipe connections, between tools, and where it is difficult to achieve a tight coupling.

The current fed power supply disclosed herein provides several advantages compared to a conventional voltage-to-voltage converter. For example, a conventional voltage-to-voltage converter that operates from a high impedance source has to accommodate a wide input voltage operating range to satisfy a wide output load current range, wherein a current-to-voltage converter operating from a high impedance source accepts a reduced input current range when satisfying a similar wide output load current range. Reducing the equivalent voltage/current operating range can result in better efficiency, high power density, lower complexity and improved reliability.

Considering a downhole application, the current fed power supply circuit provided herein reduces the voltage stress on the input filter components, downhole cable head and interconnects. A current-to-voltage converter operates with input voltages that are at or below the power supply system's peak power delivery operating point. Nominal output loading cause input voltage levels that are approximately half of the value that is required of a voltage converter, and input voltage that approaches zero light or no-load conditions.

FIG. 1 illustrates a system diagram of a power delivery system 100. The power delivery system 100 includes a power source 110, a power interface 120, and a current fed power supply circuit 130. The power delivery system 100 can be an AC system or a DC system. The power delivery system 100 may include additional components or devices that are not illustrated or discussed herein that are typically included in power delivery systems. For example, the power delivery system 100 may include additional components or devices for AC-to-DC conversion when needed.

The power delivery system 100 provides a regulated electrical current flow to the current fed power supply circuit 130 that performs power processing to produce regulated voltages for a device or devices connected thereto. The power delivery system 100 can be a downhole power delivery system that provides a regulated electrical current flow at a downhole cable head requiring current-to-voltage power processing for regulated voltages that power a logging tool, a system of tools, or tool strings. The power delivery system 100 can be employed in other applications besides a downhole application, such as applications having a high source impedance and require regulated output voltages.

The multiple regulated output voltages can support a wide load range wherein loading may only be restricted by the sum of the output load powers, plus converter power loss, not exceeding the maximum available power that can be delivered to the input. Without adding additional converters connected in parallel or in cascade to meet individual tool power demands, this provides flexibility in, for example building downhole tool strings since additional power is available for an instrument bus when less demand is placed on an auxiliary bus.

Other application examples for the power delivery system 100 include solar array power system, wireless chargers for automobiles and portable equipment, and electric cars. The power system 100 could also be configured to regulate a turbine-alternator powered with permanent magnet alternators, a permanent magnet alternator driven by an aircraft engines, or other means.

The power source 110 is configured to provide power to the current fed power supply circuit 130 via the power interface 120. In some embodiments, the power source 110 provides a regulated current to the current fed power supply circuit 130. The current sourcing can be approximated when the power interface 120 has a high impedance. The power source 110 can be an AC or DC current source. The power source 110 can be a conventional power supply that employs a current limit as the desired current limit setting and the voltage setting as the open-circuit fault protection voltage limit. The power source 110, therefore, can have a current set to a desired value and employ the voltage as a limit. Thus, the power source 110 provides a compliant source voltage and a constant source current for the power delivery system 100. For example, load current changes on the output terminals 134, 136, and 138 results in a change in input voltage at input terminal 132. Accordingly, the compliant source voltage responds to load power changes at the current fed power supply circuit 130 and draws the needed input power by adjusting the voltage at the input terminal 132.

The power source 110 can be a current power source or a voltage source. When power source 110 is a voltage source, the power interface 120 can be a power transfer means, coupling, or interface, such as long wireline cables, that ballast an input interface 132 of the current fed power supply circuit 130 to approximate a current feed to the current fed power supply circuit 130. When the power source 110 is a current source, the impedance value of the power interface 120 can advantageously be either a high or low value.

The power source 110 can be an ideal current source. Additionally, the power source 110 can be a power source that reflects a source impedance great enough to approximate a current driven input to the current fed power supply circuit 130.

Figure 2:
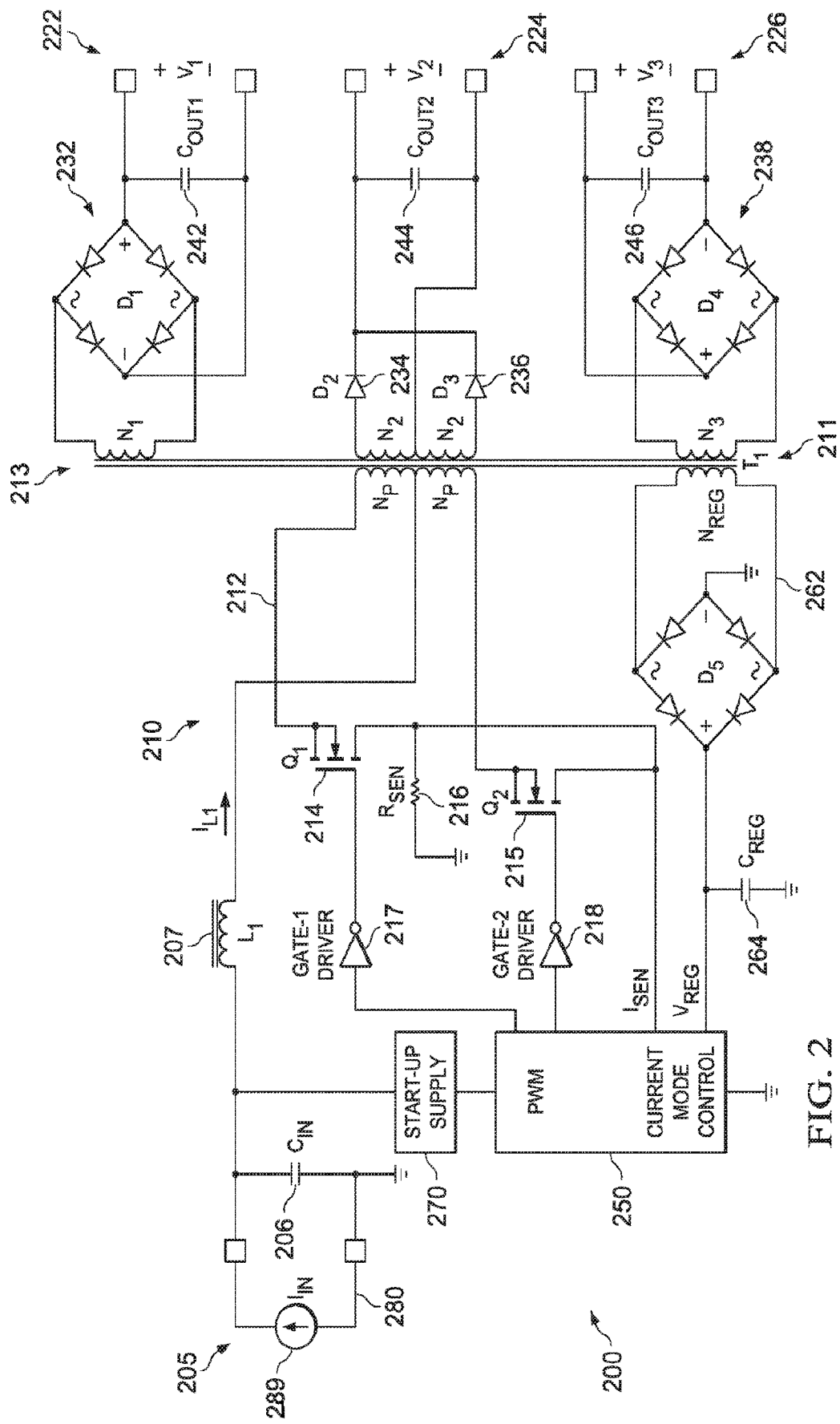
FIG. 2 illustrates a schematic diagram of a current-to-voltage converter.
Figure 2A:
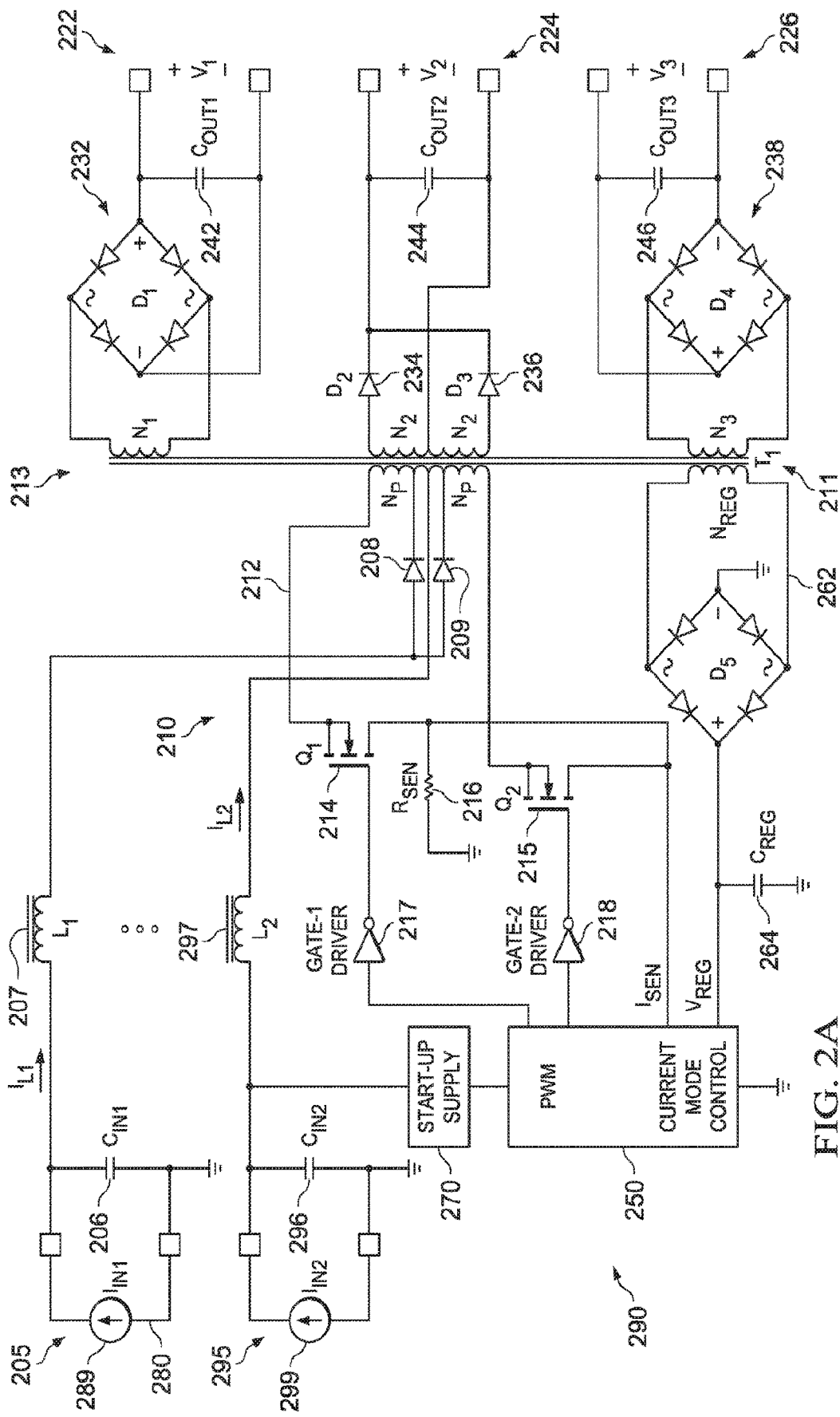
FIG. 2A illustrates a schematic diagram of a current-to-voltage converter having multiple current power sources.
Figure 5:
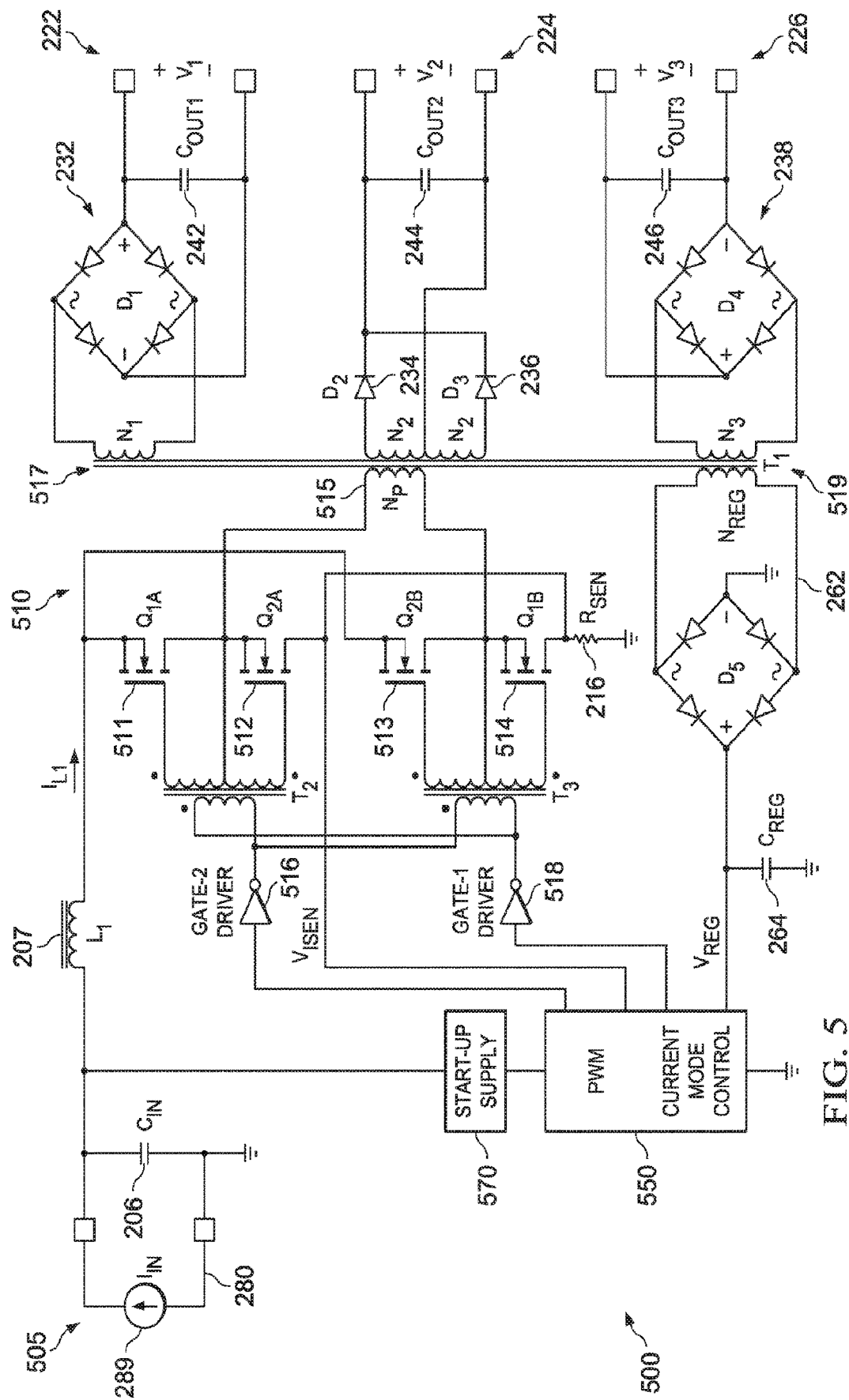
FIG. 5 illustrates a schematic diagram of another embodiment of a current-to-voltage converter.

The power interface 120 is a transmission medium that delivers power from the power source 110 to the current fed power converter 130. The power interface 120 can vary depending on the application. In a downhole application, the power interface 120 can be a cable, such as a wireline cable, that connects the power source 110 located at the surface of a hole to the current fed power supply circuit 130 located downhole. The cables can be 20,000 feet in length and typically have small gauge wire, relative to their length, resulting in significant line drops and high source impedances; especially in some applications where the cable length is 45,000 feet for extended depth applications. In other applications, the power interface 120 can be phone lines or a wireless medium that delivers power to mobile devices for wireless power charging. Regardless the application, the power interface 120, operating in combination with the power source 110, has an output impedance that exceeds the magnitude of the input impedance at input terminal 132 for stable operation. The source impedance 120 can have a magnitude that is substantially greater than an input impedance of the current fed power supply circuit 130, wherein substantially greater is two or more times as great under worst case input supply line and load demand conditions. The current fed power supply circuit 130 receives a current at its input and produces a plurality of regulated voltages as outputs. In some embodiments, the current fed power supply circuit 130 can provide AC output voltages or DC output voltages. The current fed power supply circuit 130 can be a current-to-voltage converter. In some embodiments, the current fed power supply circuit 130 can be a push-pull current-to-voltage converter such as illustrated in FIG. 2 or FIG. 2A. In other embodiments, the current fed power supply circuit 130 can be a H-bridge current-to-voltage converter such as illustrated in FIG. 5.

The current fed power supply circuit 130 includes an input terminal 132, power switching circuitry 133, and output terminals 134, 136 and 138. The input terminal 132 is coupled to the power interface 120 and receives the current from the power source 110. The input terminal 132 is a power input port for the current fed power supply circuit 130 and may be used as a current summing node for multiple current sources. In a downhole application where multiconductor wirelines are used to deliver power downhole in different modes, the current fed power supply circuit 130 can be configured to accept multiple current buses, in different proportionalities, that produce peak powers, at different voltages relative to their sources.

The power switching circuitry 133 includes multiple power switches and a transformer that converts the current received at the input terminal 132 into a plurality of regulated voltages. The output terminals 134, 136, 138, are each uniquely coupled to a different secondary winding of the transformer and receive one of the plurality of regulated voltages therefrom. More details of an embodiment of a current fed power supply circuit are discussed below with respect to FIG. 2.

FIG. 2 illustrates a schematic diagram of a current-to-voltage converter 200 constructed according to the principles disclosed herein. The current-to-voltage converter 200 is a push-pull current-to-voltage converter. The current-to-voltage converter 200 is connected to a current power source 289 via input terminals 205. $I_{in}$ in FIG. 2 represents the current that is fed from the power source 289 to the input terminals 205 of the current-to-voltage converter 200. The current power source 289 may be an ideal current source, or a source that reflects a source impedance great enough to approximate a current driven input to the converter. The current power source 289 may be coupled to the current-voltage converter 200 via a high impedance connection, such as a wireline cable described above.

In addition to the input terminals 205, the current-to-voltage converter 200 includes a capacitor 206, illustrated as $C_{in}$ in FIG. 2, that is coupled across the input terminals 205 and is connected to a first end of inductor 207, illustrated as $L_1$ in FIG. 2. A second end of the inductor 207 is coupled to power switching circuitry 210 that converts the current received at the input terminals 205 into a plurality of regulated output voltages. The bulk of the energy storage for the current-to-voltage converter 200 is located at its regulated voltage outputs. This means that step load changes are well filtered by the larger bulk output energy storage, and the current-to-voltage converter 200 can more quickly slew to a new steady-state operating point due to the selected $C_{in}$ value, and the corresponding faster $L_1$-$C_{in}$ time response.

The power switching circuitry 210 includes a transformer 211, denoted as $T_1$ in FIG. 2, having a primary winding 212 and secondary windings 213. The current-to-voltage converter 200 also includes multiple output terminals that are each uniquely coupled to one of the plurality of secondary windings 213. Output terminal 222 is coupled to secondary winding $N_1$, output terminal 224 is coupled to secondary winding $N_2$, and output terminal 226 is coupled to secondary winding $N_3$. Secondary voltages $V_1$, $V_2$, $V_3$, at the output terminals 222, 224, 226, may be isolated from any or all other voltage inputs and outputs as needed depending on the application of the current-to-voltage converter 200.

Capacitor 206 and inductor 207 are provided to smooth the switched voltage waveform that appears at the center tap of transformer 211 reflecting a DC voltage with acceptable voltage ripple at the input of the current-to voltage converter 200. In contrast, voltage-to-voltage converters typically have some form of L-C filter to smooth the input current ripple at its input port while maintaining a relative constant voltage at the transformer's center tap.

The power switching circuitry 210 also includes multiple power switches 214, 215, also denoted as transistors $Q_1$ and $Q_2$ in FIG. 2. The multiple power switches 214, 215, switch the input current $I_{L1}$ that channels current and energy to the outputs of the current-to-voltage converter 200, output terminals 222, 224, and 226, and shunts excess current back to the current source 289 via its power return 280. During periods when both power switches 214, 215, are in conduction, additional energy is stored in the inductor 207. During periods when only one of the two power switches is in conduction, energy is transferred from inductor 207 and the current source 289 to the output terminals 222, 224, and 226.

The power switching circuitry 210 also includes a grounding resistor 216, denoted as $R_{sen}$, coupled between the power switches 214, 215. The grounding resistor 216 provides means for supporting current-mode-control as commonly implemented in switch mode power converters. In some embodiments, such as without internal current mode control, the grounding resistor 216 is optional.

The transformer 211 transforms primary winding $N_p$ voltage and current to any number of the secondary windings $N_1$, $N_2$, and $N_3$ The secondary windings $N_1$, $N_2$, and $N_3$ are coupled to the output terminals 22, 224, 226, via unidirectional conducting devices 232, 234, 236, and 238, respectively. Coupled to each of the output terminals is a filter 242, 244, 246, represented in FIG. 2 by the capacitors $C_{out1}$, $C_{out2}$, and $C_{out3}$ coupled across the respective output terminals. The transformer 211 also transforms the primary winding $N_p$ voltage and current to surrogate winding $N_{reg}$ that provides a voltage $V_{reg}$ to a control circuit 250 of the current-to-voltage converter 200. Other regulation feedback means commonly used in the art may also be employed in different embodiments. $N_{reg}$ is coupled to the control circuit 250 via the unidirectional conducting device 262 and the filter 264, represented by $C_{reg}$ in FIG. 2, that is for the feedback voltage as part of a closed loop control system. The control circuit 250 is pulse width modulation (PWM) circuitry that is configured to control the duty cycles of the power switches 214, 215, via gate drive circuitry that includes gate drivers 217, 218. The control circuit 250 employs an inverted negative feedback scheme to control the duty cycles. An inverted negative feedback scheme differs from a voltage-to-voltage converter by inverting its feedback signal such that when its regulated output voltage falls below/above the regulation set point, the duty cycle is decreased/increased resulting in a corresponding increase/decrease in its input voltage. In contrast, a conventional voltage-to-voltage power converter increases/decreases its input current in response to an increase/decrease in load current at its output(s). This is achieved by increasing/decreasing its duty cycle in response to its regulated output voltage falling below/above the regulation set point by negative feedback means.

The control circuit 250 receives the voltage $V_{reg}$ and current $I_{sen}$. The voltage signal $V_{reg}$ is employed for voltage regulation feedback and for housekeeping power by the control circuit 250. The current $I_{sen}$ is used for current mode control and provides an inner control loop nested within the outer feedback voltage (Vreg) control loop. $I_{sen}$ can be used to control peak currents during each half cycle of the power switches 214, 215, improve transformer volt-second balancing, and simplify control compensation and performance. Additionally, for the current-to-voltage converter 200, $I_{sen}$ can control or limit the converter turn-on transient response. When current power source 289 increases from zero amps to its target regulated current, excess energy is initially stored in capacitor 206 ($C_{in}$). When the duty cycle of the current-to-voltage converter 200 increases to shunt the excess input current, the excess energy in capacitor 206 transfers to the capacitors $C_{out1}$, $C_{out2}$, and $C_{out3}$, of the filters 242, 244, 246. Cout Caps. Thus, $C_{in}$ can be designed to have a relatively small value based on the turns ratio of the transformer 211, capacitors $C_{out1}$, $C_{out2}$, and $C_{out3}$ designed to have a relatively large value based on the turns ratio of the transformer 211, and $I_{sen}$ used to avoid stressful overcurrent conditions.

The current-to-voltage converter 200 also includes a start-up power supply 270 that is configured to power the control circuit 250 and gate drivers 217, 218, during the turn-on period of the current-to-voltage converter 200. Following startup, the voltage ($V_{reg}$) is used for cross-regulating the output voltages $V_1$, $V_2$, $V_3$, at the output terminals 222, 224, 226, and can also supply power to operate the control circuit 250 and the gate drivers 217, 218, yielding improved efficiency.

The current-to-voltage converter 200 is configured to provide two methods for producing filtered full-wave rectified output voltages, and generating positive output voltages $V_1$ & $V_2$ and negative output voltage $V_3$. The two different methods are continuous and discontinuous operating modes as discussed below. Thus, the current-to-voltage converter 200 can be used to provide different polarities and different voltages relative to a ground reference.

FIG. 2A illustrates a schematic diagram of a current-to-voltage converter 290 having multiple current power sources. Having multiple current sources allows input load scaling to simultaneously operate from multiple sources at their individual optimum power delivery profiles. In FIG. 2A one multiple current power source is illustrated as current power source 299. Other current power sources can be similarly coupled to the current-to-voltage converter 290.

Like current-to-voltage converter 200, the current-to-voltage converter 290 is a push-pull current-to-voltage converter. Common reference designators used in both FIG. 2 and FIG. 2A correspond to the same functionality as described with respect to FIG. 2. In addition to the current power source 289, current-to-voltage converter 290 is also connected to current power source 299 via input terminals 295. The current power source 299 can be the same type of current source as current power source 289. $I_{in2}$ in FIG. 2A represents the current that is fed from the power source 299 to the input terminals 295 of the current-to-voltage converter 290.

In addition to the input terminals 295, the current-to-voltage converter 290 includes a capacitor 296, illustrated as $C_{in2}$ in FIG. 2A, that is coupled across the input terminals 295 and is connected to a first end of inductor 297, illustrated as $L_2$ in FIG. 2A. A second end of the inductor 297 is coupled to power switching circuitry 210. In the current-to-voltage converter 290, the second end of the inductor 207 is coupled to the primary winding 212 via two unidirectional conducting devices 208, 209.

Figure 3:
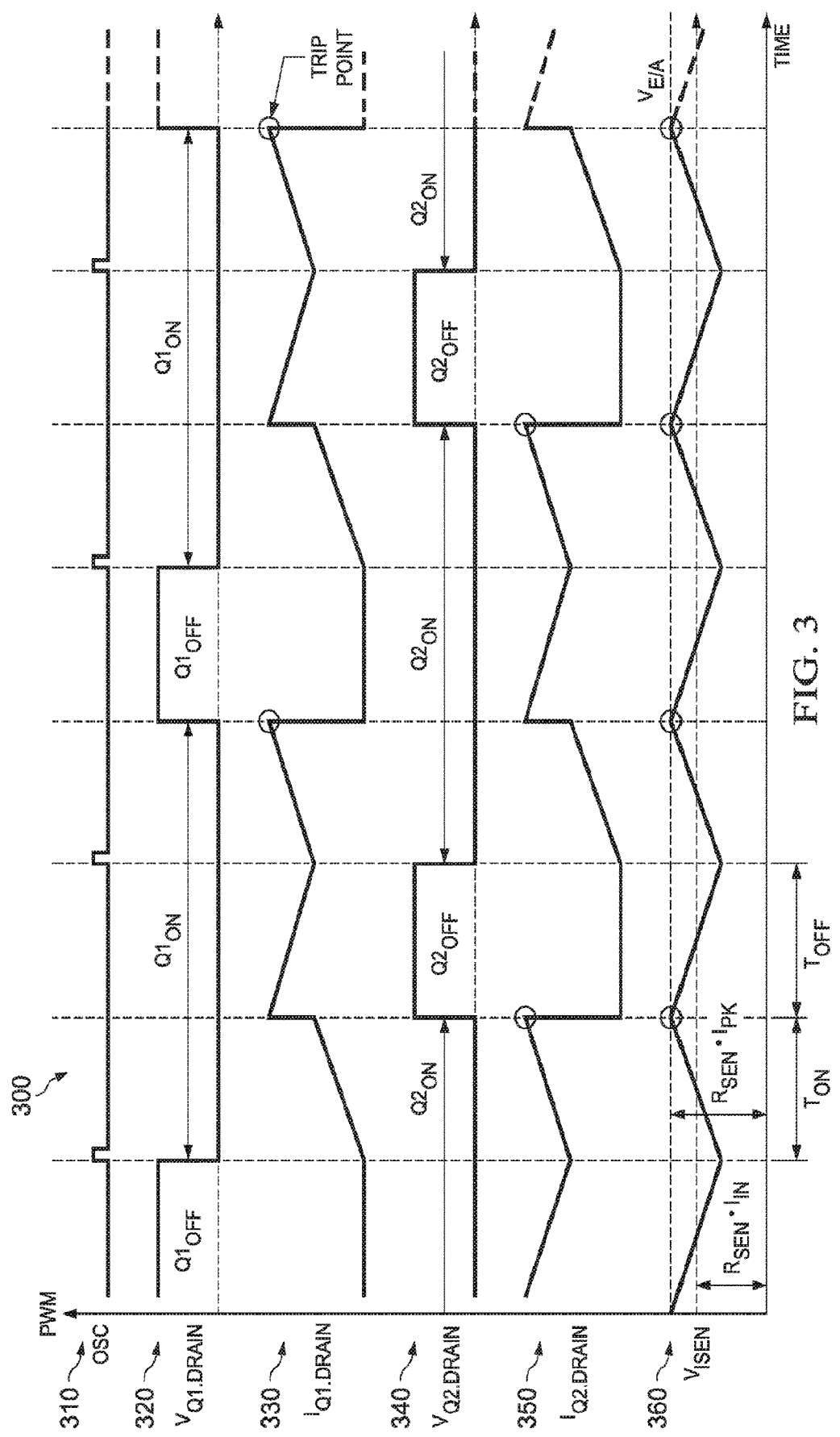
FIG. 3 illustrates a graph having waveforms that correspond to operation of the current-to-voltage converter of FIG. 2 in a continuous conduction mode.

FIG. 3 illustrates a graph 300 having waveforms that correspond to operation of the current-to-voltage converter 200 in a continuous conduction mode. Continuous conduction refers to the current flowing in inductor 207 and continuous conduction mode is when the design of a converter does not allow the current flowing through the inductor 207 to fall to zero. Conversely, when the design of a convertor causes the current of the inductor, such as inductor 207, to fall to zero, this is commonly referred to as a discontinuous conduction mode converter. The graph 300 includes waveforms for an inverted PWM oscillator signal 310, a drain voltage 320 that represents the voltage across the drain of power switch 214, a switch current 330 that represents the current through power switch 214, a drain voltage 340 that represents the voltage across the drain of power switch 215, a switch current 350 that represents the current through power switch 215, and sense voltage 360. The x-axis of the graph 300 is time and the y-axis includes the magnitude of the waveforms.

The inverted PWM oscillator signal 310 sets the operating frequency for the timing and control of the current-to-voltage converter 200. The inverted PWM oscillator signal 310 is a leading edge signal that is used to control the operation of the power switches 214, 215. Typical selected clock frequencies range from 20 kHz to 250 kHz. The PWM oscillator signal 310 also establishes a minimum duty cycle for operation of the current-to-voltage converter 200. Minimum duty cycle means the shortest time period where both of the power switches 214, 215, are conducting current (turned-on), or must be conducting current. In contrast, the minimum duty cycle limit in a voltage fed push-pull converter means the shortest time period where both transistors must be turned-off not-conducting current. In fact, the two power transistors (for a voltage-to-voltage converter topology) must never conduct simultaneously when fed from a voltage source, and when this converter topology is fed by a current, the two power transistors do not simultaneously turn-off without providing means for conducting current due to energy stored in inductor 207. This is a fundamental difference between current-to-voltage converters disclosed herein and conventional voltage-to-voltage converters. The inverted PWM oscillator signal 310 is generated by the control circuit 250. The circles on the waveforms of the switch current 330, the switch current 350, and the sense voltage 360 are PWM activated trip points for each cycle. One such timing and control trip point method is denoted in FIG. 3.

The sense voltage 360 is a scaled value that represents the sum of the switch currents 330 and 350. A comparator of the control circuit 250 turns off power switch 214 or power switch 215 when $V_{sen}$ equals $V_{E/A}$. $V_{E/A}$ is the peak input current $I_{in}*R_{sen}$.

Figure 4:
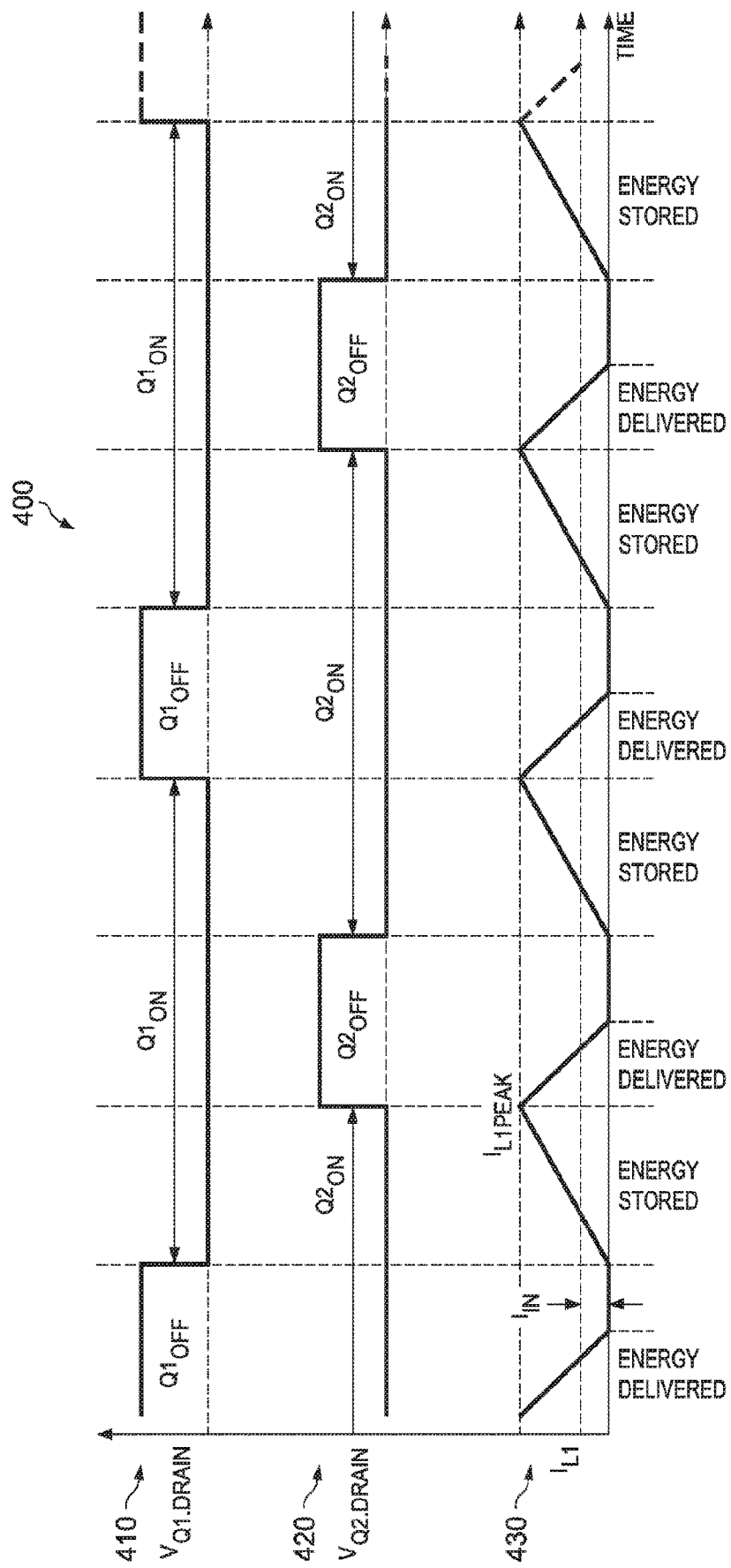
FIG. 4 illustrates a graph having waveforms that correspond to operation of the current-to-voltage converter of FIG. 2 in a discontinuous conduction mode.

FIG. 4 illustrates a graph 400 having waveforms that correspond to operation of the current-to-voltage converter 200 in a discontinuous conduction mode. Discontinuous operation occurs when the inductor 207 completely transfers its stored energy to the loads at the output terminals 222, 224, 226, on each half cycle of the push-pull current-to-voltage converter 200. The graph 400 includes waveforms for a drain voltage 410 that represents the voltage across the drain of power switch 214, a drain voltage 420 that represents the voltage across the drain of power switch 215, and inductor current 430 that represents the current through inductor 220. The x-axis of the graph 400 is time and the y-axis includes the amplitudes or relative magnitudes of the waveforms.

The value of the inductor 207 and the operating frequency for PWM are selected by a designer to provide the selected operating mode of the current-to-voltage convertor 200 depending on the application. In some applications, the continuous/discontinuous boundary is selected to allow the current-to-voltage convertor 200 to transition between the two different modes of operation. During discontinuous operation there is a dead period where energy is not being stored nor transferred within the current-to-voltage convertor 200. Accordingly, the inductor current 430 waveform indicates time periods when energy is delivered, when energy is being stored, and when energy is neither being delivered nor stored.

FIG. 5 illustrates a schematic diagram of another embodiment of a current-to-voltage converter 500 constructed according to the principles disclosed herein. The current-to-voltage converter 500 is an H-Bridge configuration. Common reference designators used in both FIG. 5 and FIG. 2 correspond to the same functionality as described with respect to FIG. 2 and the waveforms presented in FIG. 3 and FIG. 4. The values of the common references may change depending on the applications.

The current-to-voltage converter 500 is coupled to the current power source 289 via the input terminals 505 and includes power switching circuitry 510 that includes four power switches 511, 512, 513, 514, and a transformer 519 denoted as $T_1$ in FIG. 5, having a primary winding 515 and secondary windings 517. The four power switches 511, 512, 513, 514, are configured as an H-Bridge. The current-to-voltage converter 500 lowers the voltage stress levels on the power switches 511, 512, 513, 514, by 50% compared to the power switches of the current-to-voltage converter 200, and avoids the need for a split primary winding simplifying transformer 519 at the expense of doubling the number of switches that are simultaneously in conduction, and increased gate drive complexity. Switches 511, 513 ($Q_{1a}/Q_{1b}$), and 512, 514 ($Q_{2a}/Q_{2b}$) conduct simultaneously as plotted for power switch 214 $Q_1$ and power switch 215 $Q_2$ in FIG. 3 and FIG. 4 the transistor gates are driven relative to their source.

The current-to-voltage converter 500 includes a control circuit 550 and a start-up power supply 270. The control circuit 550 is pulse width modulation (PWM) circuitry that is configured to control the duty cycles of the power switches 511, 512, 513, 514, via gate drive circuitry that includes gate drivers 516, 518, and transformers $T_2$, $T_3$. Transformers $T_2$ and $T_3$ magnetically couple the gate drivers 516, 518, to the power switches 511, 512, 513, 514. The control circuit 550 employs an inverted negative feedback scheme to control the duty cycles. The start-up power supply 570 is configured to power the control circuit 550 and gate drivers 516, 518, during the turn-on period of the current-to-voltage converter 500.

Figure 6:
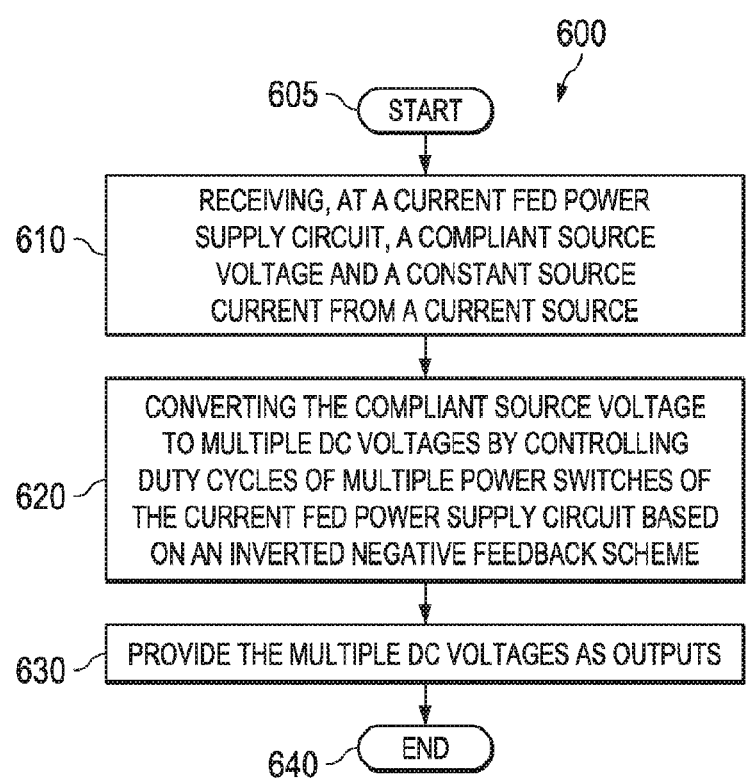
FIG. 6 illustrates a flow diagram of a method for producing DC voltages from a current source.

FIG. 6 illustrates a flow diagram of a method 600 for producing DC voltages from a current source. The method can be implemented by one of the current fed power circuits disclosed herein. The method 600 begins in a step 605.

In a step 610, a compliant source voltage and a constant source current are received at a current fed power supply circuit from a current source. The current fed power supply circuit may be a push-pull current-to-voltage converter such as illustrated in FIG. 2. The current fed power supply circuit may be an H-bridge current-to-voltage converter such as illustrated in FIG. 5.

The current source for the current fed power circuit can be at the surface of a well and the current fed power supply circuit can be downhole of the well. In such embodiments, the receiving can be via a wireline cable connecting the current source to the current fed power supply. When combined with the surface power supply, the wireline cable can have an impedance substantially greater than an input impedance of the current fed power supply circuit. The current fed power supply circuit can include an energy storage device, power switching circuitry including a transformer having a primary winding and a plurality of secondary windings, and multiple output terminals that are each uniquely coupled to one of the plurality of secondary windings.

In a step 620, the compliant source voltage is converted to multiple DC voltages by controlling duty cycles of multiple power switches of the current fed power supply circuit based on an inverted negative feedback scheme. During converting to the multiple DC voltages, at least one of the multiple power switches is conducting. Additionally, energy is stored in an energy storage device of the current fed power supply circuit when the multiple power switches are simultaneously conducting.

The DC voltages are provided in a step 630. The DC voltage can be provided to the multiple output terminals of the current fed power supply. The method 600 ends in a step 640.

Figure 7:
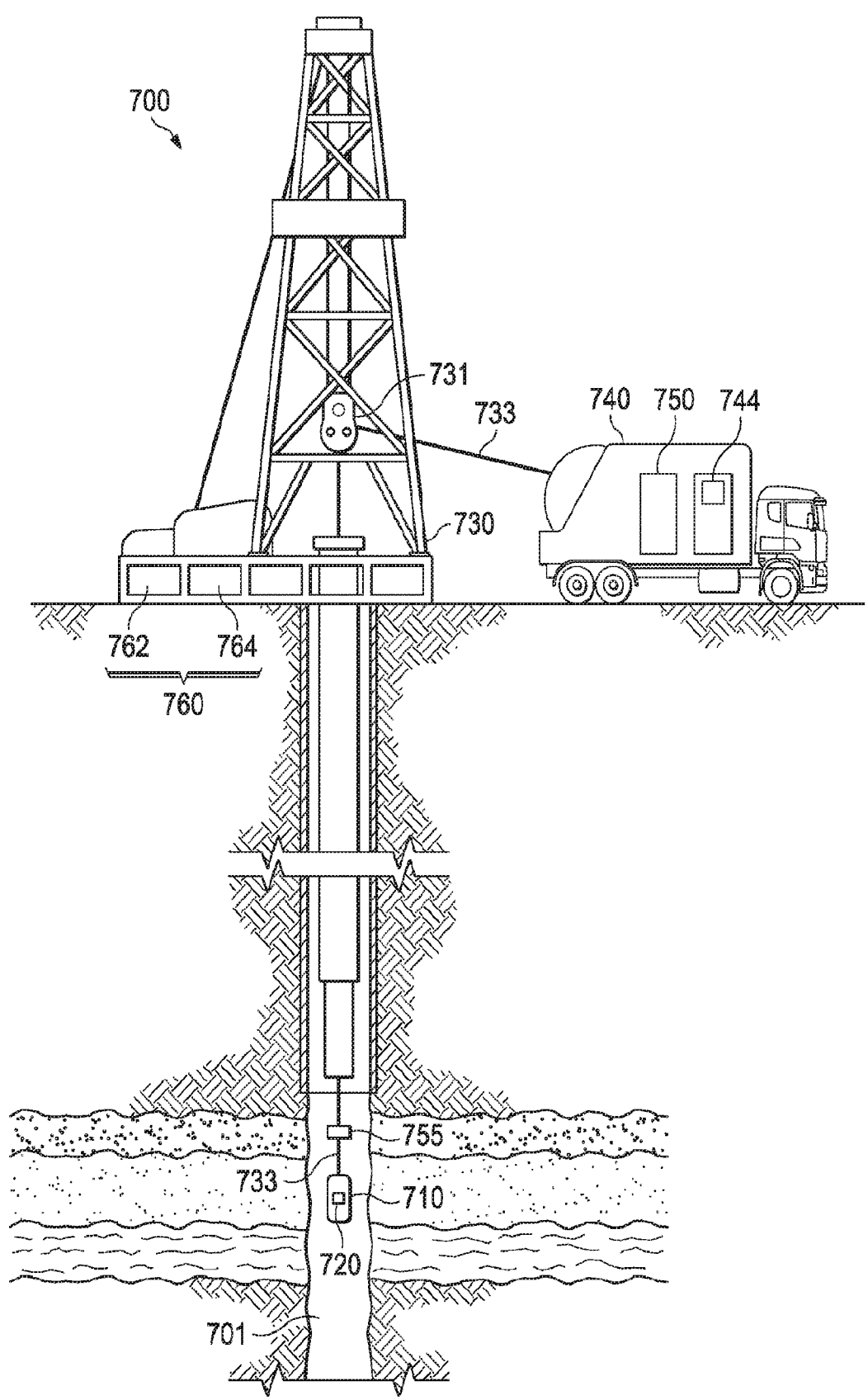
FIG. 7 illustrates a wireline system configured to perform formation testing and sampling.

FIG. 7 illustrates a wireline system 700 configured to perform formation testing and sampling. After drilling of a wellbore 701 is complete, it may be desirable to know more details of types of formation fluids and the associated characteristics through sampling with use of a wireline formation tester. A downhole power supply such as disclosed herein may be used for the formation testing and sampling.

Wireline system 700 may include a wireline tool 710 that forms part of a wireline logging operation that can include an NMR transceiver 720 as part of a downhole measurement tool. Wireline system 700 may include a derrick 730 that supports a traveling block 731, and the wireline tool 710, such as a probe or a sonde, may be lowered by wireline or logging cable 733 into a borehole 701. The wireline tool 710 may be lowered to the bottom of the region of interest and subsequently pulled upward at a substantially constant speed. The wireline tool 710 may be configured to measure fluid properties of the wellbore fluids, and any measurement data generated by wireline tool 710 and the one or more NMR transceiver 720 can be communicated to a surface logging facility 740 for storage, processing, and/or analysis.

Logging facility 740 may be provided with electronic equipment 744, including processors for various types of signal processing. The logging facility 740 may further include a power source 750 that provides power via the logging cable 733 to a current fed power supply circuit 755 located downhole. The power supply 750 can be one of the power sources disclosed herein, such as power source 110 or current power source 289. The current fed power supply circuit 755 converts the power received from the power supply 750 to a plurality of output voltages that can be used to provide power to various downhole devices, such as the wireline tool 710. The current fed power supply circuit 755 may be the current fed power supply circuit 130 or the current-to-voltage converters 200 or 500 discussed above. The logging cable 733 may be a high impedance source compared to the input impedance of the current fed power supply 755. Wireline system 700 may further include a controller 760 that directs operation thereof and includes a processor 762 and a memory 764.

Figure 8:
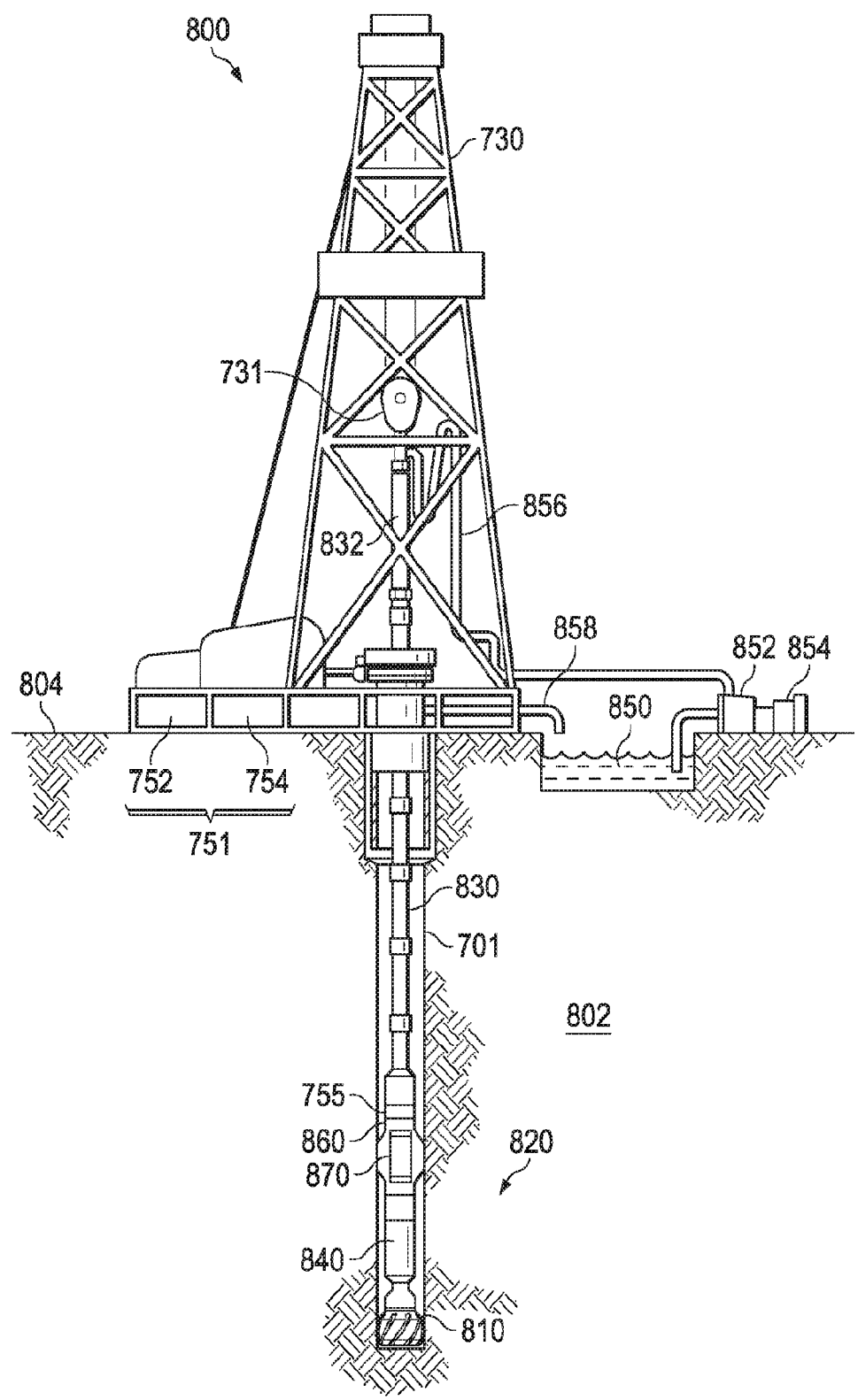
FIG. 8 illustrates a logging while drilling (LWD) system configured to perform formation drilling.

FIG. 8 illustrates a logging while drilling (LWD) system 800 configured to perform formation drilling. Borehole 701 may be created by drilling into the earth 802 using a drilling tool. LWD system 800 may be configured to drive bottom hole assembly (BHA) 820 positioned or otherwise arranged at the bottom of a drill string 830 extended into the earth 802 from derrick 730 arranged at the surface 804. Derrick 730 includes a kelly 832 and a traveling block 731 used to lower and raise the kelly 732 and drill string 830.

BHA 820 may include a drill tool 810 operatively coupled to a tool string 840 which may be moved axially within wellbore 701 as attached to the tool string 840. During operation, drill tool 810 penetrates the earth 802 and thereby creates wellbore 701. BHA 820 provides directional control of drill tool 810 as it advances into earth 802. Tool string 840 can be semi-permanently mounted with various measurement tools (not shown) such as, but not limited to, measurement-while-drilling (MWD) and logging-while-drilling (LWD) tools, that may be configured to take downhole measurements of drilling conditions. In other embodiments, the measurement tools may be self-contained within drill string 830.

Fluid or "drilling mud" from a mud tank 850 may be pumped downhole using a mud pump 852 powered by an adjacent power source, such as a prime mover or motor 854. The drilling mud may be pumped from mud tank 850, through a stand pipe 856, which feeds the drilling mud into drill string 830 and conveys the same to drill tool 810. The drilling mud exits one or more nozzles arranged in drill tool 810 and in the process cools drill tool 810. After exiting drill tool 810, the mud circulates back to the surface 804 via the annulus defined between the wellbore 701 and the drill string 830, and in the process, returns drill cuttings and debris to the surface. The cuttings and mud mixture are passed through a flow line 858 and are processed such that a cleaned mud is returned down hole through the stand pipe 856 once again. BHA 820 may further include an LWD tool 860. LWD tool 860 may include a sensor that incorporates the use of a NMR transceiver 870. LWD tool 860 may be positioned between drill string 830 and drill tool 810. Coupled to the LWD tool 860 or included therein can be the current fed power supply circuit 755 that can be used to provide power for various downhole tools when powered from a high impedance alternator, or similar current source means. Wireline tool 710 and LWD tool 860 may be referred to as a downhole tool.

A controller 750 including a processor 752 and a memory 754 may direct operation of the LWD system 800. While NMR transceiver 870 may be placed at the bottom of wellbore 701, and extend for a few inches, a communication channel may be established by using electrical signals or mud pulse telemetry for most of the length of tool string 830 from drill tool 810 to controller 750. In some embodiments, controller 750 may receive information from NMR transceiver 870 about drilling conditions in wellbore 701 and controller 750 may provide a command to BHA 820 to modify certain drilling parameters. For example, controller 750 may provide a command to adjust or change the drilling direction of drill tool 810 based on a message contained in information provided by NMR transceiver 870. In that regard, the information provided by NMR transceiver 870 to controller 750 may include certain drilling conditions such as physical or chemical properties of the drilling mud in the subterranean environment.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure. In addition to NMR, the methods described herein can be used with other tool measurement technology including, for example, acoustic, ultrasonic, optic, induction, and nuclear.

Those skilled in the art to which this application relates will appreciate that other and further additions, deletions, substitutions and modifications may be made to the described embodiments.

Embodiments disclosed herein include:

A. A current fed power supply circuit, including input terminals, an energy storage device having a first end coupled to the input terminals, power switching circuitry coupled to a second end of the energy storage device and including a transformer having a primary winding and a plurality of secondary windings, and multiple output terminals that are each uniquely coupled to one of the plurality of secondary windings, wherein the power switching circuitry converts a current received at the input terminals to a plurality of regulated voltages at the multiple output terminals.

B. A method for producing DC voltages from a current source that includes receiving, at a current fed power supply circuit, a compliant source voltage and a constant source current from a current source, and converting the compliant source voltage to multiple DC voltages by controlling duty cycles of multiple power switches of the current fed power supply circuit based on an inverted negative feedback scheme.

C. A power delivery system, including a current source configured to provide a compliant source voltage and a constant source current and a current fed power supply circuit. The current fed power supply circuit including an input terminal, power switching circuitry coupled to the current source via the input terminal and including a transformer having a primary winding and a plurality of secondary windings, and multiple output terminals that are each uniquely coupled to one of the plurality of secondary windings and that each provide a DC converted voltage from the compliant source voltage.

Each of embodiments A, B, and C may have one or more of the following additional elements in combination:

Element 1: wherein the power control circuitry includes multiple power switches and energy is stored in the energy storage device when the multiple power switches are simultaneously conducting. Element 2: a control circuit configured to employ an inverted duty factor, negative feedback scheme to control duty cycles of the multiple switches. Element 3: wherein the power supply circuit is a push-pull current-to-voltage converter. Element 4: wherein the power supply circuit is an H-bridge current-to-voltage converter. Element 5: a start-up power supply coupled to the first end of the energy storage device. Element 6: wherein at least one of the multiple power switches is conducting when the power supply circuit is operating. Element 7: wherein the current fed power circuit is a push-pull current-to-voltage converter. Element 8: wherein the current fed power circuit is an H-bridge current-to-voltage converter. Element 9: wherein at least one of the multiple power switches is conducting during the converting. Element 10: wherein energy is stored in an energy storage device of the current fed power supply circuit when the multiple power switches are simultaneously conducting. Element 11: wherein the current source is located at a surface of a well, the current fed power supply circuit is downhole of the well, and the receiving is via a wireline cable connecting the current source to the current fed power supply circuit, the wireline cable having an impedance substantially greater than an input impedance of the current fed power supply circuit. Element 12: wherein the current fed power supply circuit includes an energy storage device, power switching circuitry including a transformer having a primary winding and a plurality of secondary windings, and multiple output terminals that are each uniquely coupled to one of the plurality of secondary windings, wherein the method further includes providing the DC voltages to the multiple output terminals. Element 13: wherein the power switching circuitry includes multiple power switches and energy is stored in an energy storage device of the current fed power supply circuit when the multiple power switches are simultaneously conducting. Element 14: a control circuit configured to employ an inverted negative feedback scheme to control duty cycles of the multiple switches. Element 15: wherein at least one of the multiple power switches is conducting when the current fed power supply circuit is operating. Element 16: wherein the power delivery system is a downhole power delivery system for a well, the current source is at a surface of the well, and the current fed power supply circuit is downhole of the well, the power delivery system further comprising a wireline connecting the current source to the current fed power supply circuit, wherein the wireline has an impedance that is substantially greater than an input impedance at the input terminal. Element 17: wherein the power supply circuit is a push-pull current-to-voltage converter or an H-bridge current-to-voltage converter.

What is claimed is:

1. A current fed power supply circuit, comprising:
input terminals;
a current source coupled between said input terminals;
an energy storage device having a first end coupled to said input terminals;
power switching circuitry coupled to a second end of said energy storage device and including a transformer having a primary winding and a plurality of secondary windings; and
multiple output terminals that are each uniquely coupled to one of said plurality of secondary windings, wherein said power switching circuitry converts a current received at said input terminals to a plurality of regulated voltages at said multiple output terminals;

wherein said power switching circuitry includes multiple power switches having duty cycles that are controlled by an inverted negative feedback scheme that increases the duty cycles when a regulated output voltage is above a regulation set point, and decreases the duty cycles when the regulated output voltage is below the regulation set point.

2. The power supply circuit as recited in claim 1 wherein energy is stored in said energy storage device when said multiple power switches are simultaneously conducting.

3. The power supply circuit as recited in claim 2 further comprising a control circuit configured to employ said inverted negative feedback scheme to control said duty cycles of said multiple power switches.

4. The power supply circuit as recited in claim 2 wherein at least one of said multiple power switches is conducting when said power supply circuit is operating.

5. The power supply circuit as recited in claim 1, wherein said power supply circuit is a push-pull current-to-voltage converter.

6. The power supply circuit as recited in claim 1, wherein said power supply circuit is an H-bridge current-to-voltage converter.

7. The power supply circuit as recited in claim 1, further comprising a start-up power supply coupled to said first end of said energy storage device.

8. A method for producing DC voltages from a current source, comprising:
  receiving, at a current fed power supply circuit, a compliant source voltage and a constant source current from a current source; and
  converting said compliant source voltage to multiple DC voltages by controlling duty cycles of multiple power switches of said current fed power supply circuit based on an inverted negative feedback scheme that increases the duty cycles when a regulated output voltage is above a regulation set point, and decreases the duty cycles when the regulated output voltage is below the regulation set point.

9. The method as recited in claim 8 wherein said current fed power supply circuit is a push-pull current-to-voltage converter.

10. The method as recited in claim 8 wherein said current fed power supply circuit is an H-bridge current-to-voltage converter.

11. The method as recited in claim 8, wherein at least one of said multiple power switches is conducting during said converting.

12. The method as recited in claim 8, wherein energy is stored in an energy storage device of said current fed power supply circuit when said multiple power switches are simultaneously conducting.

13. The method as recited in claim 8, wherein said current source is located at a surface of a well, said current fed power supply circuit is downhole of said well, and said receiving is via a wireline cable connecting said current source to said current fed power supply circuit, said wireline cable having an impedance substantially greater than an input impedance of said current fed power supply circuit.

14. The method as recited in claim 8, wherein said current fed power supply circuit includes an energy storage device, power switching circuitry including a transformer having a primary winding and a plurality of secondary windings, and multiple output terminals that are each uniquely coupled to one of said plurality of secondary windings, wherein said method further includes providing said DC voltages to said multiple output terminals.

15. A downhole power delivery system, comprising:
  a current source, located at a surface of a well, configured to provide a compliant source voltage and a constant source current;
  a current fed power supply circuit, located downhole of said well, including:
    an input terminal;
    power switching circuitry, coupled to said current source via said input terminal, including a transformer having a primary winding and a plurality of secondary windings; and
    multiple output terminals that are each uniquely coupled to one of said plurality of secondary windings and that each provide a DC converted voltage from said compliant source voltage; and
  a wireline connecting said current source at said surface to said current fed power supply circuit within said well, wherein said wireline has an impedance that is substantially greater than an input impedance at said input terminal.

16. The power delivery system as recited in claim 15 wherein said power switching circuitry includes multiple power switches and energy is stored in an energy storage device of said current fed power supply circuit when said multiple power switches are simultaneously conducting.

17. The power delivery system as recited in claim 16 further comprising a control circuit configured to employ an inverted negative feedback scheme to control duty cycles of said multiple power switches.

18. The power delivery system as recited in claim 16 wherein at least one of said multiple power switches is conducting when said current fed power supply circuit is operating.

19. The power delivery system as recited in claim 15, wherein said power supply circuit is a push-pull current-to-voltage converter or an H-bridge current-to-voltage converter.

* * * * *